Oct. 15, 1957 C. R. BANKS 2,809,459
FISHING LINE SIGNAL DEVICE
Filed March 18, 1957 2 Sheets-Sheet 2
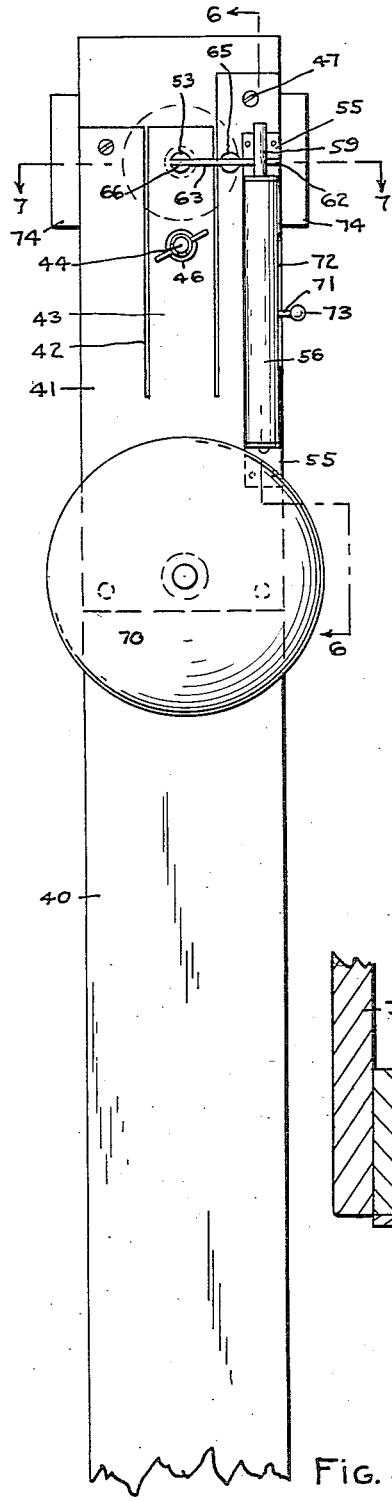
FIG. 5.
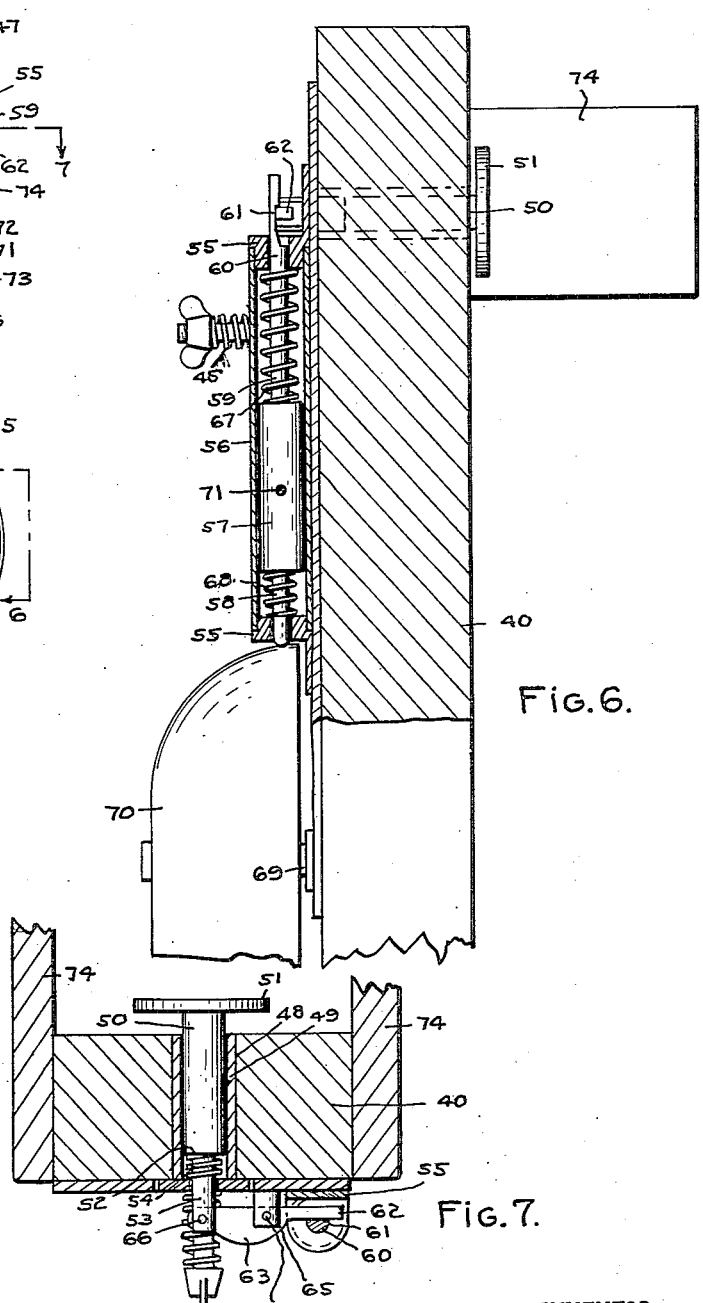
FIG. 6.
FIG. 7.
INVENTOR.
CLARENCE R. BANKS,
BY
ATTORNEY

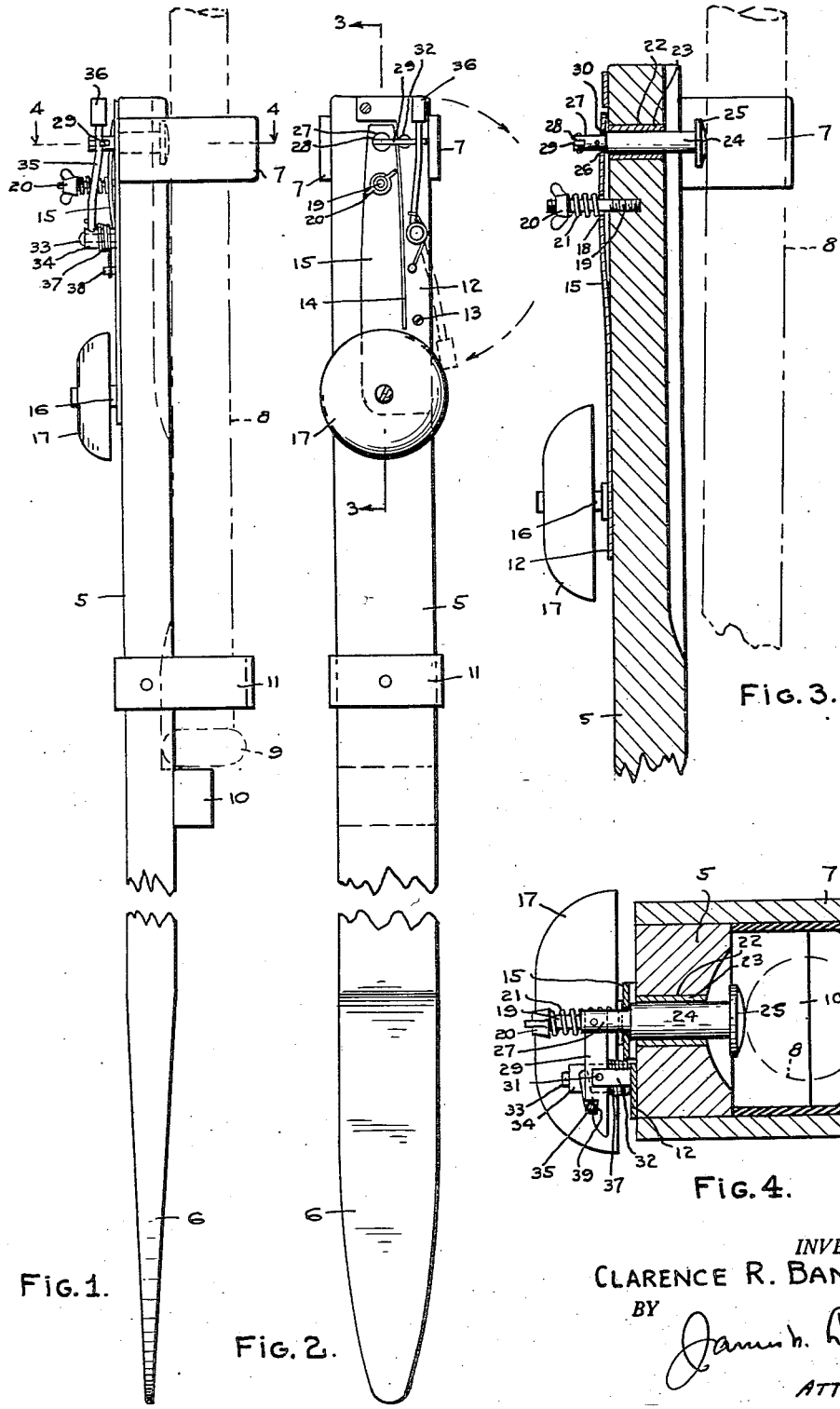

United States Patent Office 2,809,459
Patented Oct. 15, 1957

2,809,459

FISHING LINE SIGNAL DEVICE

Clarence R. Banks, Hollywood, Fla.

Application March 18, 1957, Serial No. 646,865

7 Claims. (Cl. 43—17)

This invention relates to a combined fishing rod holder and signal device to indicate a strike by a fish upon the fishing line.

Fishing rod holders have previously been employed for supporting the rod in an upright position, such as is commonly employed in surf casting or the like, where the holder is forced into the ground or into the sand of the beach at a proper angle to receive and support the rod after the line and the baited hook have been cast into the water and the device of the present invention is particularly advantageous when the fisherman is employing two or more rods.

The invention contemplates in addition to the rod holder, audible signal means that are actuated when the fish pulls upon the line and whereby to advise the fisherman of the strike and with the signal means being spring-actuated to a release position where it will strike a bell or other sound producing element and with the signal device being subsequently reset for a further operation.

The holder embodies novel means for supporting the fishing rod in an upright position so that the rod may be quickly removed from the holder after the signal has sounded to enable the fisherman to promptly proceed with the winding of a conventional reel and with the fishing rod when in the supported position being disposed against a trip device that is actuated when a fish pulls upon the line and whereby to release the striker mechanism.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

In the drawings:

Figure 1 is a side elevation of a device constructed in accordance with the invention, Figure 2 is a front view illustrating the striker mechanism in the set position, Figure 3 is a vertical section taken substantially on line 3—3 of Figure 2, Figure 4 is an enlarged horizontal section taken substantially on line 4—4 of Figure 1, Figure 5 is a fragmentary front elevation illustrating a modified form of the invention, Figure 6 is an enlarged vertical section taken substantially on line 6—6 of Figure 5 and Figure 7 is a horizontal section taken substantially on line 7—7 of Figure 5.

Referring specifically to the drawings and particularly to Figures 1-4 inclusive, the numeral 5 designates a ground stake, formed of wood or other suitable material. The ground stake 5 is generally rectangular in cross-section and at its lower end is tapered downwardly to form a ground piercing portion 6 and whereby the device may be easily forced into the ground to support the stake in an upright manner. The stake adjacent its upper end is provided with a pair of wing portions 7, constituting a socket to prevent lateral movement of the fishing rod, shown in dotted lines at 8. The fishing rod 8 is of any conventional form commonly employed in surf casting and having the usual butt portion having a lower cushioned end 9. The cushion end 9 rests upon a block 10. Above the block 10 there has been provided a loop 11 of any suitable material, such as leather and with the loop 11 being of such diameter as to permit of the ready insertion of the head 9 therethrough to rest upon the block 10. It will therefore be apparent, that in actual use, the butt of the rod is inserted downwardly through the loop 11 where its cushion head 9 rests upon the block 10, at which time the rod is swung forwardly to be disposed between the wings 7. In normal use the stake 5 is slightly forwardly inclined so that the rod will lean in a direction toward the stake.

Fixed upon the forward face of the stake 5 is a metallic plate 12. The plate 12 is screwed or riveted to the face of the stake, as at 13. The plate 12 has been slotted at 14 to form a spring tongue 15. The lower end of the plate 12 is provided with a post 16, supporting a bell 17. The tongue 15 is apertured at 18 for the passage of a threaded pin 19, having a wing nut 20 threaded thereon. A spring 21 is disposed between the nut 20 and the face of the tongue 15 and whereby to vary the tension upon the tongue. The stake 5 adjacent its upper end is apertured at 22 to receive a suitable bushing 23. Slidable through the bushing 23 is an actuator pin 24, carrying an enlarged head 25 that projects rearwardly from the stake to lie in the path of swinging movement of the rod 8. The pin 24 is shouldered at 26, providing a reduced end 27, that is slotted at 28 to pivotally receive one end of a latch dog 29. The shoulder 26 engages the inner face of the tongue 15, while the reduced shank portion 27 extends through an aperture 30 of the tongue. It will thus be seen, that when the rod is rocked forwardly, it will press upon the head 25 and the pin 24, shifting the tongue 15 outwardly against the tension of the spring 21 for rocking the dog 29 to a release position. The dog 29 intermediate its length is pivotally connected at 31, to a fixed post 32 carried by the plate 12.

Pivotally supported upon a post 33, is a sleeve 34, carrying a striker arm 35, having a striker head 36. A suitable spring 37 is wrapped about the sleeve 34, with one end engaging the arm 35, while the opposite end is connected to a fixed lug 38. The arm 35 is biased to swing in an arc from a latched position to a point where it strikes the bell 17. The arm 35 in the latched position, engages a notch 39 formed upon the dog 29.

In the operation of the device so far described, with the stake in pierced engagement with the ground, the rod is employed to first cast the baited hook and the usual sinker forwardly into the surf, after which the butt of the rod is inserted downwardly through the loop 11 to rest upon the block 10, at which time the rod is swung forwardly to assume an angular position according to the angularity of the stake and the fisherman then is able to attend to other rods without the necessity of holding the rod in his hands. When a fish strikes upon the line, the rod is pulled forwardly, pressing upon the head 25 of the pin 24, forcing the pin forwardly against the tension of the tongue 15, rocking the dog 29 upon the pivot 31, releasing the arm 35 and permitting the spring 37 to swing the arm and its striker head 36 in an arc to strike the bell 17, thus audibly advising the fisherman of the strike upon the line and, upon the sounding of the bell, the fisherman lifts the rod bodily from the loop 11 and proceeds to wind the reel to pull the fish to shore. Prior to again casting the baited hook, the arm 35 is swung upwardly to latched engagement with the dog 29.

In the form of the invention illustrated in Figures 5-7 inclusive, there has been provided a substantially identical stake 40. Fixedly positioned upon the forward face of the stake 40 is a metallic plate 41. The plate 41 has been slotted at 42 to form a spring tongue 43. The tongue 43 has been apertured to receive a fixed pin 44, similar to the previously described pin 19 and whereupon is disposed a tension spring 45 carrying an adjusting wing nut 46 and whereby the tension may be controlled to a fine degree in accordance with the type of fishing being performed. The plate 41 is screwed or otherwise connected to the stake 40, as at 47. The upper end of the stake 40 is apertured at 48, to receive a bushing 49. The bushing 49 slidably receives a cylindrical stud 50 carrying a cylindrical head 51 that is disposed rearwardly of the stake to lie in the path of a fishing rod supported thereon. The stud 50 is shouldered at 52, providing a reduced cylindrical shank portion 53. Disposed between the shoulder 52 and the tongue 43 is a compression spring 54. The spring 54 is sufficiently strong that it will permit flexing of the tongue 43 when the rod is swung forwardly but should the tension upon the spring 43 be adjusted to too great a tension, the stud 50 can be shifted against the tension of the spring 54 when an exceptionally large fish strikes the line to actuate the audible signal, to be described, and to avoid the dislocation and a possible loss of a rod, should too large a fish strike the line that would pull the stake from the ground.

Rigidly connected to the plate 41 at one side, as by bushing-forming end brackets 55 is a cylindrical barrel 56. Slidable within the barrel 56 is a piston 57 that is reduced at its lower end to form a striker pin 58. The piston 57 at its upper end has been reduced in diameter to form a piston rod 59, that projects upwardly beyond the bushing 55, as at 60 and with the rod 60 at its upper end being notched at 61 to receive a tail portion 62 of a latch dog 63. The latch dog 63 is pivoted at 64 upon a fixed stud 65. The opposite end of the latch dog 63 is pivotally connected at 66 within a slot formed in the free end of the shank portion 53. Disposed between the upper end of the piston 57 and the upper bushing 55 is a compression spring 67 and through the medium of which the piston is shifted downwardly to project the striker pin 58 outwardly beyond the lower bushing 55. A recoil spring 68 is disposed between the lower end of the piston 57 and the lower bushing 55, such spring 58 cushioning the downward movement of the piston and causing the piston to be partially retracted for causing the pin 58 to be withdrawn from its actual striking position. Fixed upon the lower end of the plate 41, as by a stud 69, is a bell 70. The bell 70 is disposed in the path of movement of the pin 58. The piston 57 is shifted upwardly against the tension of the spring 67, whereby to have latching engagement with the dog 63, by a pin 71, that projects outwardly through a slot 72 formed in the cylinder 56. The pin 71 is provided with a knob 73.

In the use of this form of the invention, the stake 40 is shoved to a substantial depth into the ground. The fishing rod 8 having been employed to cast the baited hook and sinker, is then disposed within the loop, such as that illustrated in the first form of the invention for resting engagement upon the block, after which the rod is swung to a position between the wings 74 and against the head 51 of the pin 50. The piston 57 having been shifted upwardly to a latched engagement with the dog 63, the device is now ready for operation. When a fish strikes upon the line, he pulls the rod forwardly, forcing the pin 50 forwardly against the tension of the tongue 43, rocking the dog 63 upon the pivot 64 to release the rod 60, and permitting the spring 67 to project the piston 57 downwardly, forcing the pin 58 downwardly to strike the bell 70. When the pin 58 strikes the bell, it will be retracted under the influence of the recoil spring 68 so that it will be free of contacting engagement with the bell. The fisherman then proceeds to quickly remove the rod and wind the fish in a customary manner, as before pointed out. It is contemplated that the several parts, including the plate 41 and its associated tongue 43, the cylinder 56, the piston and piston rods, together with the latch mechanism, shall all be formed of a material having a high degree of resistance to corrosion or rusting. The spring 54 serves to permit the actuation of the signal, regardless of the tension imparted to the tongue 43 by the nut 46 and the spring 45.

It will be apparent from the foregoing that a very novel arrangement of a ground stake and associate signal means has been provided and with the ground stake serving as the support for the fishing rod in a manner whereby the rod may be quickly and easily removed when a fish strikes upon a line. The parts are few and simple, are strong, durable, cheap to manufacture and highly effective for the purposes indicated.

It is to be understood, that the invention is not limited to the precise constructions shown, but that changes are contemplated as readily fall within the spirit of the invention as shall be determined by the scope of the subjoined claims.

Having described my invention, what I claim as new and desire to secure by Letters Patent is:

1. The combination comprising a ground stake for piercing engagement in the ground, supporting means upon one side of the stake for the upright support of a fishing rod, an audible signal device supported upon the opposite side of the stake, an actuator pin that extends through the stake and with the pin having a head portion that lies in the path of movement of the fishing rod when the rod is shifted under the influence of a fish pulling thereon, the said pin being spring loaded in a direction toward the fishing rod, latch means operable under the influence of a shifting movement of the pin when actuated by the movement of the fishing rod and striker means releasable when the latch means is actuated to strike the audible signal.

2. The combination comprising a ground stake for piercing engagement into the ground and whereby to arrange the stake in an upright position, the stake at its upper end being provided with wing members whereby to form a rearwardly opening socket for the reception of a fishing rod, a rest for the lower end of the rod and means that embraces the lower portion of the rod to hold the rod against slipping from the rest, an actuator pin that is slidably disposed through an aperture formed in the upper portion of the stake to project beyond the inner and outer faces, a spring tongue carried upon the outer face of the stake and that engages the pin to bias the pin rearwardly, the pin at its rear end having an enlarged head that is disposed in the path of swinging movement of the rod when it is pulled forward under the influence of a fish striking upon a fishing line carried by the rod, means for varying the tension of the tongue, a latch dog that is pivotally supported upon the face of the stake and with the latch at one end having pivoted connection with a forward end of the pin, a striker device carried upon the forward face of the stake and a bell supported upon the forward face of the stake and in the path of movement of the striker, the striker being normally held in inactive position by the latch dog and against the tension of a spring, the said rod when shifted forward under the influence of a striking fish causing the pin to rock the dog and release the striker to engage the bell.

3. The structure according to claim 2, wherein the striker device is pivotally supported to swing in an arc toward and from the bell, a spring device supported upon the pivotal means of the striker and whereby the striker is biased to swing from a latched engagement with the dog when the dog is actuated to a release position to a striking contact with the bell.

4. The structure according to claim 2, wherein the spring tongue is formed integral with a mounting plate that is fixed upon the forward face of the stake, the said bell, the said striker and the latch dog being all supported upon the plate as an assembly unit for mounting engagement with the face of the stake and to position the tongue in engagement with the forward projecting end of the pin.

5. The structure according to claim 2, wherein the said pin is reduced in diameter adjacent its forward end to form a reduced shank and an abutment shoulder, the said shank extending through an aperture formed in the tongue and whereby the tongue is disposed in engagement with the shoulder, the said tongue at a point below the aperture being additionally apertured for the passage of a threaded stud that is anchored in the stake, a compression spring supported upon the outer portion of the stud to bear against the face of the tongue and a nut threaded upon the stud and whereby to increase or decrease the tension of the spring and the tension of the tongue against the shoulder.

6. The combination with a ground stake and whereby to support a fishing rod in an upright manner, the stake being tapered and wedge-shaped at its lower end, wings carried at the upper end of the stake and whereby to form a rearwardly opening socket for the reception of the fishing rod, the stake adjacent its upper end being apertured for the reception of a bushing, an actuator pin that is slidably engaged in the bushing to project beyond the front and rear faces of the stake, the pin at its rear end being provided with an enlarged head that is disposed in a position to be engaged by the fishing rod and whereby the pin will be shifted forwardly when the rod is biased forwardly under the influence of a fish pulling upon a fishing line carried by the rod, the pin being reduced at its forward portion to form a reduced shank and a shoulder, a metallic mounting plate fixed to the forward face of the stake, the plate being slotted to form an elongated spring tongue, the said tongue adjacent its upper end being apertured for the passage of the said shank, a latch dog that is pivotally supported upon the plate and with the dog also being pivotally connected to the end of the shank, means whereby to increase or decrease the tension of the tongue, a cylinder fixedly supported upon the plate, a piston slidable in the cylinder and with the piston at one end being provided with a piston rod that extends above the piston for notched engagement with a tail portion formed on the dog, spring means in the cylinder for projecting the piston downwardly when the latch dog is released, the lower end of the piston being provided with a striker pin that extends beyond the lower end of the cylinder when the piston is released by the dog, a bell supported upon the plate and having an area thereof disposed in the path of movement of the striker pin, a recoil spring disposed in the cylinder and over the striker pin whereby the piston and striker pin are partially shifted upwardly after the pin has engaged the bell and means to reset the piston and piston rod to a latched engagement with the dog.

7. The structure according to claim 6, wherein a coiled spring is carried by the shank of the actuator pin and whereby to bear against the shoulder and the inner face of the spring tongue and whereby the actuator pin may be actuated to shift the dog when too great a tension is placed upon the tongue.

No references cited.